April 12, 1955   J. F. KEPPLER ET AL   2,705,839
DEVICE FOR INDICATING HEIGHTS OF INDIVIDUALS
Filed Feb. 4, 1954   2 Sheets-Sheet 1

INVENTORS
JOHN F. KEPPLER AND
WILBUR J. BARTON
By Herbert A. Minturn
ATTORNEY

April 12, 1955  J. F. KEPPLER ET AL  2,705,839
DEVICE FOR INDICATING HEIGHTS OF INDIVIDUALS
Filed Feb. 4, 1954  2 Sheets-Sheet 2
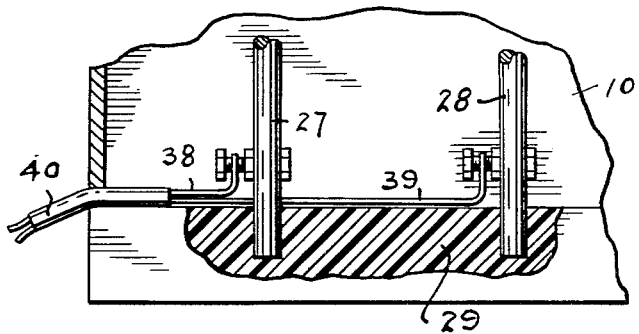
Fig. 4.
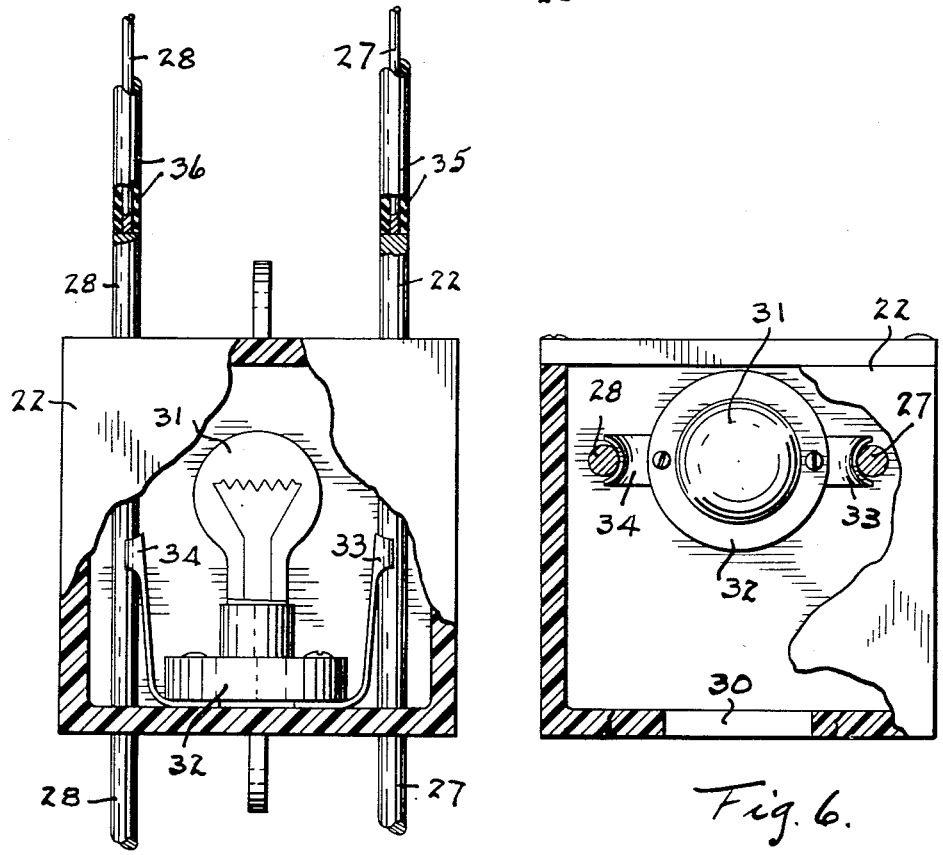
Fig. 5.
Fig. 6.
INVENTORS
JOHN F. KEPPLER AND
WILBUR J. BARTON
By Herbert A. Minturn
ATTORNEY

United States Patent Office 2,705,839
Patented Apr. 12, 1955

2,705,839
DEVICE FOR INDICATING HEIGHTS OF INDIVIDUALS

John F. Keppler and Wilbur J. Barton, Indianapolis, Ind.

Application February 4, 1954, Serial No. 408,190

1 Claim. (Cl. 33—172)

This invention relates to a device for indicating heights of individuals by simple means of pulling a head plate down on top of the individual's head and noticing the spot of light on a vertically disposed indicator panel. The device consists essentially of an indicator lamp box which is slidably disposed along two vertical rods or rails to have a beam of light from that lamp directed upon a sanded or translucent glass wall which has been marked off in graduations indicating feet and portions thereof. Furthermore the device includes means for causing the light indicating box to travel downwardly simultaneously with the lowering of the head plate so that the beam will be traveling downwardly from a greater height to a lesser height. The device further includes means for cutting off the flow of energy to the lamp in the indicator box when the device is not in use.

The device finds particular use in those places where heights of individuals are frequently measured such for example as in hospital examining rooms, industrial examining rooms, and in doctor's offices, as well as in many other places. A primary object of the device is to provide an exceedingly simple and yet a reliable device for the purpose above indicated, and at the same time provide such a device in a form which will be relatively low cost in manufacturing and which may be readily applied to any location where the measuring is to be conducted, such for example as being applied to a scale on which the individual is being weighed so that his height may also be measured while the individual is standing on the scale.

These and many other objects and advantages of the invention will become apparent to those versed in the art in the following description of one particular form of the invention as illustrated in the accompanying drawings, in which Fig. 1 is a view in front elevation with a portion of the front wall broken away showing a device embodying the invention;

Fig. 4 is a view on an enlarged scale of a detail of the mounting of the vertical lamp cage guides;

Fig. 5 is a detail in front elevation and partial section of the lamp cage mounted on its guides; and Fig. 6 is a view in top plan of the lamp cage in partial section.

Figure 1:
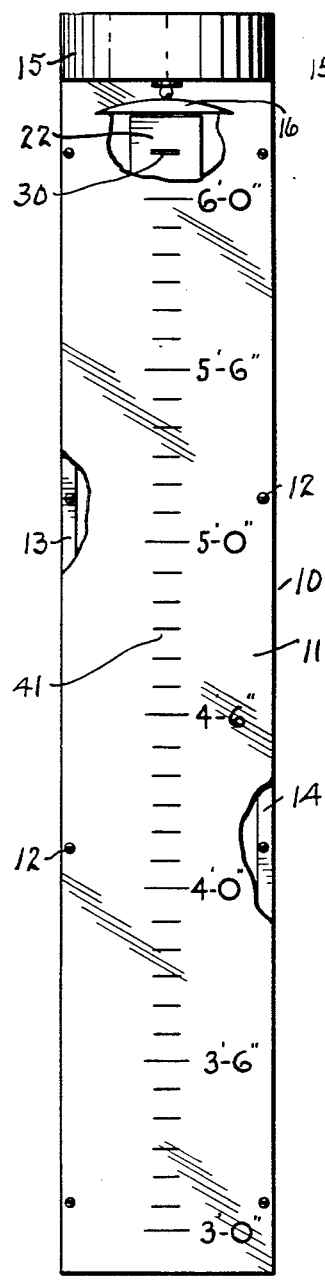

An upright housing 10 is formed to have a front cover plate 11 preferably made out of a single panel of glass which may be either translucent glass or a glass which has been sand blasted or ground. This front panel 11 is secured to the housing 10 in any suitable manner, herein indicated as by means of screws 12 around the margin of the panel which enter and engage flanges 13 and 14 turned over from the side walls of the housing 10.

The upper end of the housing 10 has a forwardly projecting chamber 15. Under this chamber 15, there is suspended a head plate 16 secured to a cable or cord 17 which enters the chamber 15 from the under side, passes over a pulley 18 therein, then around the pulley 19 and down over pulley 20 to extend downwardly within the housing 10 by a length 17a carried on down to a pulley 21 in the lower end of the housing 10, and then upwardly a length 17b to the under side of a lamp housing or cage 22. A second cable or cord 23 is fixed to the cage 22 and is carried upwardly over a pulley 24 at the top end of the housing 10, and then over and downwardly around a pulley 25 within the housing 10 to have a weight 26 secured to its lower end.

The lamp cage 22 is slidingly guided vertically on two spaced apart guides 27 and 28, the upper and lower ends of which are secured to the top and bottom ends of the housing 10 and insulated therefrom. As indicated in Fig. 4, the lower ends of these rods 27 and 28 are secured in an insulating floor 29 which forms the bottom of the housing. The front side of the cage 22 is provided with a narrow, horizontally disposed slit 30 which is in close proximity with the back side of the glass panel 11.

Figure 2:
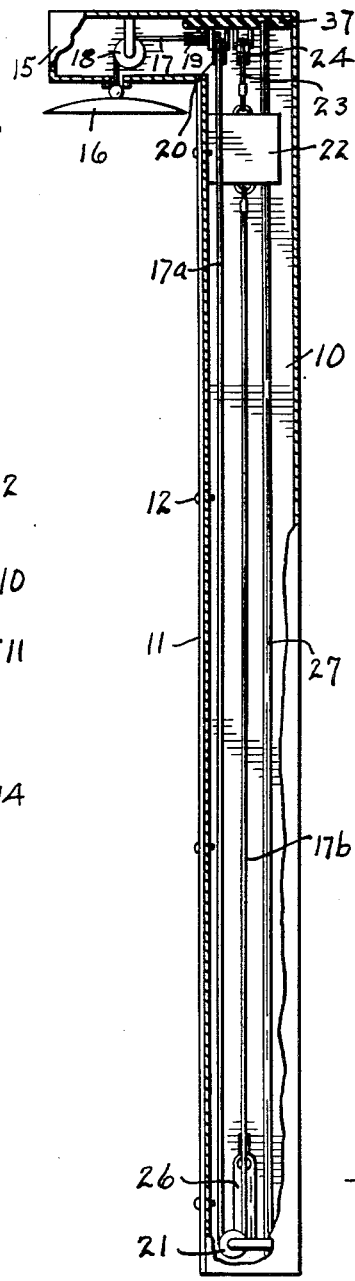
Fig. 2 is a view in side elevation and partial section.
Figure 3:
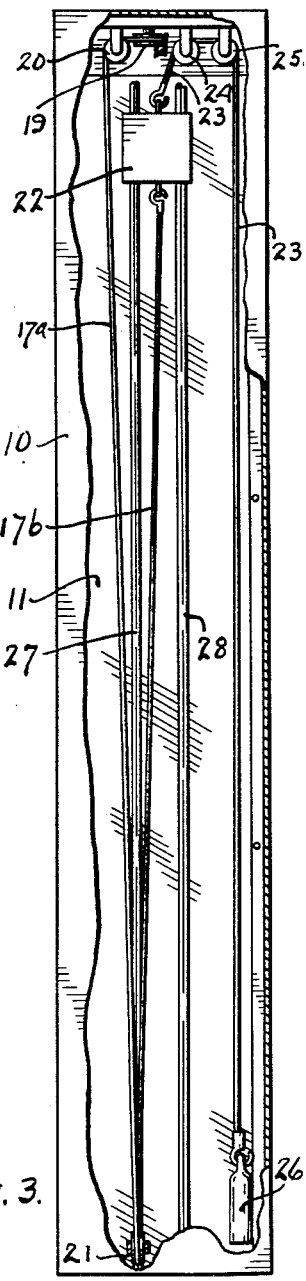
Fig. 3 is a view in rear elevation and partial section.

Inside of the cage 22, there is a lamp 31 mounted in any suitable receptacle 32, from the terminals of which there extend the respective brushes 33 and 34 spring like in nature and yieldingly bearing against the rods 27 and 28 for electrical contact therewith. That is, the energizing circuit through the lamp 31 is had from the bars 27 and 28. The upper ends of the rods 27 and 28 are each provided respectively with insulating sleeves 35 and 36 so that when the brushes 33 and 34 may be brought into sliding engagement with those sleeves, no current can flow between the rods 27 and 28 through the lamp 31 when the cage 22 is raised to that elevation. The upper ends of these insulated portions of the rods 27 and 28 are secured in the block 37, Fig. 2 at the top end of the housing 10. Wires 38 and 39 lead from connections with the rods 27 and 28 from the housing 10 through a cable 40 to any suitable source of current.

The lamp cage 22 is free to travel up and down the guiding rods 27 and 28 as between the pull downwardly on the plate 16 and the reverse pull of the weight 26 in the opposite direction when the head plate 16 is released or allowed to travel upwardly under the influence of the weight 26. It is to be noted that the head plate 16 travels downwardly as the cage 22 travels downwardly and that the weight 26 pulls the cage 22 upwardly as the plate 16 travels upwardly. This is accomplished through the cables 17 and 23 being carried around the pulleys as above indicated.

Thus, with the construction described, when the operator pulls the plate 16 downwardly to contact the head of the person to be measured, the lamp cage 22 travels downwardly accordingly and the beam of light from the lamp 31 coming through the slit 30 will illuminate the glass panel 11 in accordance with the beam, and that beam is directed upon the central portion of the panel to indicate the height by the scale 41 provided on the glass panel. Therefore it is to be seen that we have provided an exceedingly simple device, attractive in form, and most serviceable for the purposes indicated, and while we have described the device in the one particular form, it is obvious that structural changes may be employed, such for example making contact between the lamp and the guide rods 27 and 28 all without departing from the spirit of the invention, and we therefore do not desire to be limited to that precise form beyond the limitations which may be imposed by the following claim.

We claim:

A height measuring device comprising a vertically disposed support member; a lamp cage; guides carried by said support constraining said cage to vertical travel; a head contacting member; a cable secured to said cage and carried downwardly along said support; a cable directing member at the lower end of said support around which said cable is carried; a second cable directing member at the upper end of said support; said cable extending around and upwardly from said lower directing member and over said upper directing member and engaging with said head member; a second cable length fixed to said cage and carried upwardly; second cable directing means at the upper end of said support; a cage and head member counterweight; said second cable length extending to second cable directing means and downwardly and secured to said weight; a lamp in said cage; means conducting an electric current to said lamp; a panel carried by said support; and means directing a beam of light on said panel from said lamp; said panel carrying a scale along which said beam travels as said head member is lowered and raised; said guides constituting electrical conductors of said current conducting means; brushes carried by said lamp cage and riding on said guides and interconnecting with said lamp; the uppermost portions of said guides being non-conducting and interrupting current flow to said lamp when the said cage is in its uppermost limit of travel as induced by said weight.

References Cited in the file of this patent

UNITED STATES PATENTS

| | | |
|---|---|---|
| 828,593 | Bartram | Aug. 14, 1906 |
| 1,237,735 | Wright | Aug. 21, 1917 |
| 1,978,651 | Shapiro et al. | Oct. 30, 1934 |
| 2,476,674 | McCauley | July 19, 1949 |
| 2,499,646 | Horn et al. | Mar. 7, 1950 |
| 2,582,951 | Barry | Jan. 22, 1952 |

FOREIGN PATENTS

| | | |
|---|---|---|
| 143,453 | Austria | Nov. 11, 1935 |